(12) United States Patent
Jin et al.

(10) Patent No.: US 8,416,802 B2
(45) Date of Patent: Apr. 9, 2013

(54) SEGMENTED TRANSMISSION FOR BROADCAST MESSAGES USING MULTIPLE ANTENNAS

(75) Inventors: Hang Jin, Plano, TX (US); John Grabner, Plano, TX (US); Daniel Wee, Garland, TX (US)

(73) Assignee: Cisco Technology, Inc., San Jose, CA (US)

( * ) Notice: Subject to any disclaimer, the term of this patent is extended or adjusted under 35 U.S.C. 154(b) by 634 days.

(21) Appl. No.: 12/337,210

(22) Filed: Dec. 17, 2008

(65) Prior Publication Data

US 2010/0150129 A1   Jun. 17, 2010

(51) Int. Cl.
*H04J 3/00* (2006.01)
(52) U.S. Cl. ........................................ 370/464
(58) Field of Classification Search .................. None
See application file for complete search history.

(56) References Cited

U.S. PATENT DOCUMENTS

| | | | |
|---|---|---|---|
| 8,077,692 B2 * | 12/2011 | Khandekar et al. | 370/344 |
| 8,102,831 B2 * | 1/2012 | Sudo | 370/342 |
| 2002/0018483 A1 * | 2/2002 | Kuwabara et al. | 370/430 |
| 2005/0099937 A1 * | 5/2005 | Oh et al. | 370/207 |
| 2007/0217329 A1 * | 9/2007 | Abedi | 370/208 |

\* cited by examiner

*Primary Examiner* — Fang Ng
(74) *Attorney, Agent, or Firm* — Edell, Shapiro & Finnan, LLC (57) ABSTRACT

Techniques are provided herein to segment subcarriers for broadcast transmission to one or more mobile stations. A broadcast message to be transmitted from a first device is generated. The broadcast message comprises a plurality of symbols and each symbol is to be transmitted at a different one of a plurality of frequency subcarriers. The plurality of subcarriers is divided into groups and each group of subcarriers is assigned to a corresponding one of a plurality of antennas of the first device. The groups of subcarriers are transmitted from corresponding ones of the plurality of antennas.

32 Claims, 8 Drawing Sheets

SEGMENTED TRANSMISSION FOR BROADCAST MESSAGES USING MULTIPLE ANTENNAS

TECHNICAL FIELD

The present disclosure relates to wireless communication techniques, and more particularly to broadcasting signals.

BACKGROUND

In wireless communication systems, antenna arrays are used at devices on one or both ends of a communication link to suppress multipath fading and interference, and to increase received signal power at a receiving device. In certain wireless communications systems like WiMAX™, a base station (BS) device and each of a plurality of mobile station (MS) devices are equipped with a plurality of antennas. The BS device can beamform signals to a particular MS device by weighting transmit signals in phase and magnitude for transmission via its plurality of antennas to the particular MS device. In so doing, the signals received at the particular destination device can be coherently combined to provide higher received signal power and reduced interference from other devices. The BS device uses knowledge about the over-the-air channel between it and the particular destination device to choose values for the antenna weights applied to the transmit signals.

However, certain information, such as preamble data, is intended for reception by multiple (e.g., all) destination devices within the coverage area of BS device. There are other situations where a message is to be transmitted to a particular device, but the location or spatial signature of that device is unknown. If a message is intended for a particular device whose location or spatial signature is unknown, or if a message is intended for multiple devices within a coverage area, then the BS device broadcasts the message within the coverage area using a radiation pattern that covers the entire coverage area or a desired portion of the coverage area as the case may be. Generally, the BS cannot beamform a broadcast message to multiple intended destination devices even if their locations are known, nor can the BS beamform a message to a destination device whose location or spatial signature is not known.

There are several methods to broadcast messages with an antenna array. A first method is to send the broadcast message through a single antenna. The radiation pattern of a single antenna spans the entire coverage area (or a desired portion of the coverage area) and therefore the broadcast message will be sent 'omni-directionally', i.e., the message will be transmitted according to the radiation pattern of the single antenna. The drawback of this approach is that the broadcast message will have significantly less coverage along the radius of the radiation pattern because a single antenna does not have beamforming gain or power combining gain. A second approach is to send the broadcast message using a synthesized beam pattern that spans the whole coverage area or a desired portion of the coverage area. However, beam pattern synthesis has stringent requirements on the antenna array configuration and calibration, and is not always feasible.

Accordingly, a technique is needed for transmission of broadcast messages using multiple antennas that can achieve gain at the destination devices without imposing constraints on antenna configuration and without for the need for antenna calibration.

DESCRIPTION OF EXAMPLE EMBODIMENTS

Overview

Techniques are provided herein to segment subcarriers associated with a broadcast message to be transmitted from a plurality of antennas of a first wireless communication device to one or more second wireless communication devices. The broadcast message comprises a plurality of symbols and each symbol is to be transmitted at a different one of a plurality of frequency subcarriers. The plurality of subcarriers is divided into groups or segments and each group of subcarriers is assigned to a corresponding one of a plurality of antennas of the first wireless communication device. The groups of subcarriers are transmitted from corresponding ones of the plurality of antennas.

The broadcast techniques described herein greatly improve the performance of a wireless communication system or network. In the following description, a method is described for segmenting broadcast signals that are formatted according to orthogonal frequency division multiple access (OFDMA) techniques as one example. It should be understood that these techniques can easily be extended to segment broadcast transmission signals in any multi-antenna, multi-carrier system, such as in wideband code division multiple access (W-CDMA) systems or high capacity spatial division multiple access (HC-SDMA/iBurst) systems.

Figure 1:
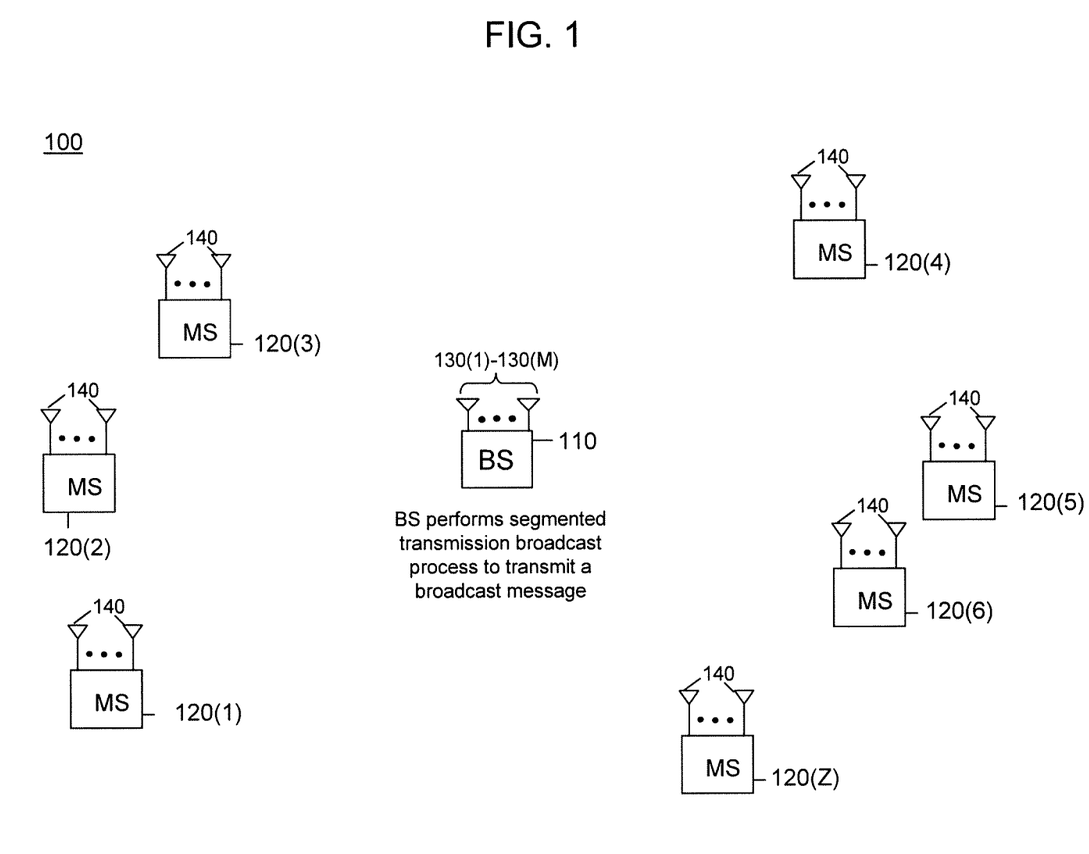
FIG. 1 is an example of a block diagram of a wireless communication system in which a first wireless communication device is configured to wirelessly transmit a broadcast message according to a segmented transmission broadcast process.

Referring first to FIG. 1, a wireless radio communication system or network is shown generally at reference numeral 100. The system 100 comprises a first wireless communication device, e.g., a base station (BS) 110, and a plurality of second wireless communication devices, e.g., mobile stations (MSs) 120(1)-120(Z). The BS 110 may connect to other wired data network facilities (not shown) and in that sense serves as a gateway or access point through which the MSs 120(1)-120(Z) have access to those data network facilities.

The BS 110 comprises a plurality of antennas 130(1)-130(M). The MSs 120(1)-120(Z) have one or more antennas shown at reference numeral 140. Each MS 120(1)-120(Z) may have a different antenna configuration (e.g., a different number of antennas). The coverage area shown in FIG. 1 is generally circular (e.g., spans 360 degrees), but it is understood that it could be divided into smaller sectors, with a BS assigned to serve each sector.

The BS 110 may wirelessly communicate with individual ones of the MSs 120(1)-120(Z) using a wideband wireless communication protocol. An example of such a wireless communication protocol is the IEEE 802.16 communication standard, also known commercially as WiMAX™. Another example of a communication protocol is the IEEE 802.11 standard known commercially as WiFi™.

The BS 110 employs a multi-carrier modulation format for messages that it transmits to the MSs 120(1)-120(Z). One example of a multi-carrier modulation format is orthogonal frequency-division multiplexing/multiple-access (OFDM/OFDMA) technology.

A broadcast message comprises a plurality of symbols and each symbol is to be transmitted at a different one of a plurality of frequency subcarriers. The BS 110 divides the plurality of subcarriers associated with the broadcast message into segments or groups according to the number M of antennas at the BS 110. Each group or segment of subcarriers is assigned to a corresponding one of the M plurality of antennas of the BS 110 when the broadcast message is transmitted. When transmitted from corresponding antennas of the BS 110, the transmitted groups of subcarriers that make up the broadcast message form spatially separated radio frequency beams (not shown) having the radiation pattern of the corresponding antenna (with no beamforming applied to the transmitted groups of subcarriers).

Figure 2:
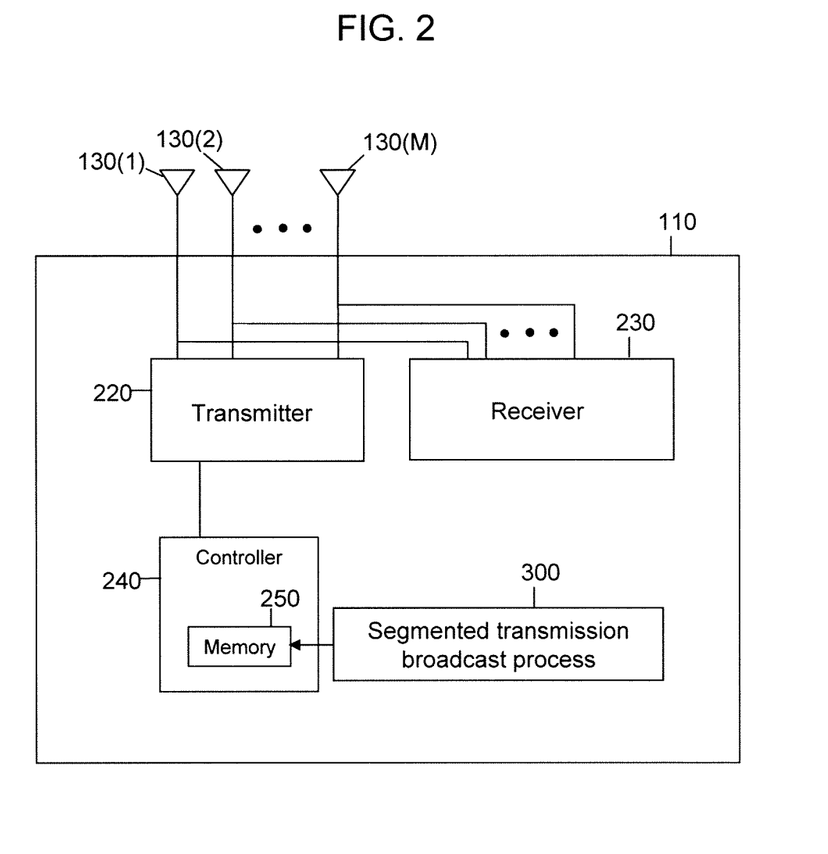
FIG. 2 is an example of a block diagram of a first wireless communication device configured to perform the segmented transmission broadcast process when transmitting a broadcast message.

Turning to FIG. 2, an example block diagram of a BS 110 configured to perform a segmented transmission broadcast process is now described. The BS 110 comprises a transmitter 220, a receiver 230, and a controller 240. The controller 240 supplies data, obtained from higher control/transport layers in the device (not shown), to the transmitter 220 to be transmitted and processes signals received by the receiver 230. In addition, the controller 240 performs other transmit and receive control functionality. Part of the functions of the transmitter 220, receiver 230 and controller 240 may be implemented in a modem and other parts of the transmitter 220 and receiver 230 may be implemented in radio transmitter and radio transceiver circuits. Likewise, the controller 240 may perform functions associated with a modem. It should be understood that there are analog-to-digital converters (ADCs) and digital-to-analog converters (DACs) in the various signal paths to convert between analog and digital signals.

The transmitter 220 comprises individual transmitter circuits that supply respective individual transmit signals to corresponding ones of the antennas 130(1)-130(M) for transmission. The receiver 230 receives the signals detected by each of the antennas 130(1)-130(M) and supplies corresponding antenna-specific receive signals to the controller 240. It is understood that the receiver 230 comprises a plurality of receiver circuits, each for a corresponding one of the antennas 130(1) to 130(M) and the transmitter 220 comprises a plurality of individual transmitter circuits. For simplicity, the individual receiver circuits and individual transmitter circuits are not shown.

The controller 240 is, for example, a signal or data processor that comprises a memory 250 or other data storage block that stores data used for the techniques described herein. The memory 250 may be separate or part of the controller 240. Instructions for performing a segmented transmission broadcast process 300 may be stored in the memory 250 for execution by the controller 240. The process 300 generates one or more broadcast messages to be transmitted by a group or groups of subcarriers in order to generate a plurality of transmit signals that are supplied by the transmitter 220 to corresponding ones of the plurality of antennas 130(1)-130(M) for transmission.

In addition, the process 300 may be configured to perform a smoothing operation at the boundaries of groups of subcarriers so that there are no large discontinuities in the magnitudes of the signals from one subcarrier group to another.

The functions of the controller 240 may be implemented by logic encoded in one or more tangible media (e.g., embedded logic such as an application specific integrated circuit, digital signal processor instructions, software that is executed by a processor, etc.), wherein the memory 250 stores data used for the computations described herein (and/or to store software or processor instructions that are executed to carry out the computations described herein). Thus, the process 300 may be implemented with fixed logic or programmable logic (e.g., software/computer instructions executed by a processor) and the controller 240 may be a programmable processor, programmable digital logic (e.g., field programmable gate array) or an application specific integrated circuit (ASIC) that comprises fixed digital logic, or a combination thereof. For example, the controller 240 may be a modem and thus be embodied by digital logic gates in a fixed or programmable digital logic integrated circuit.

Figure 3:
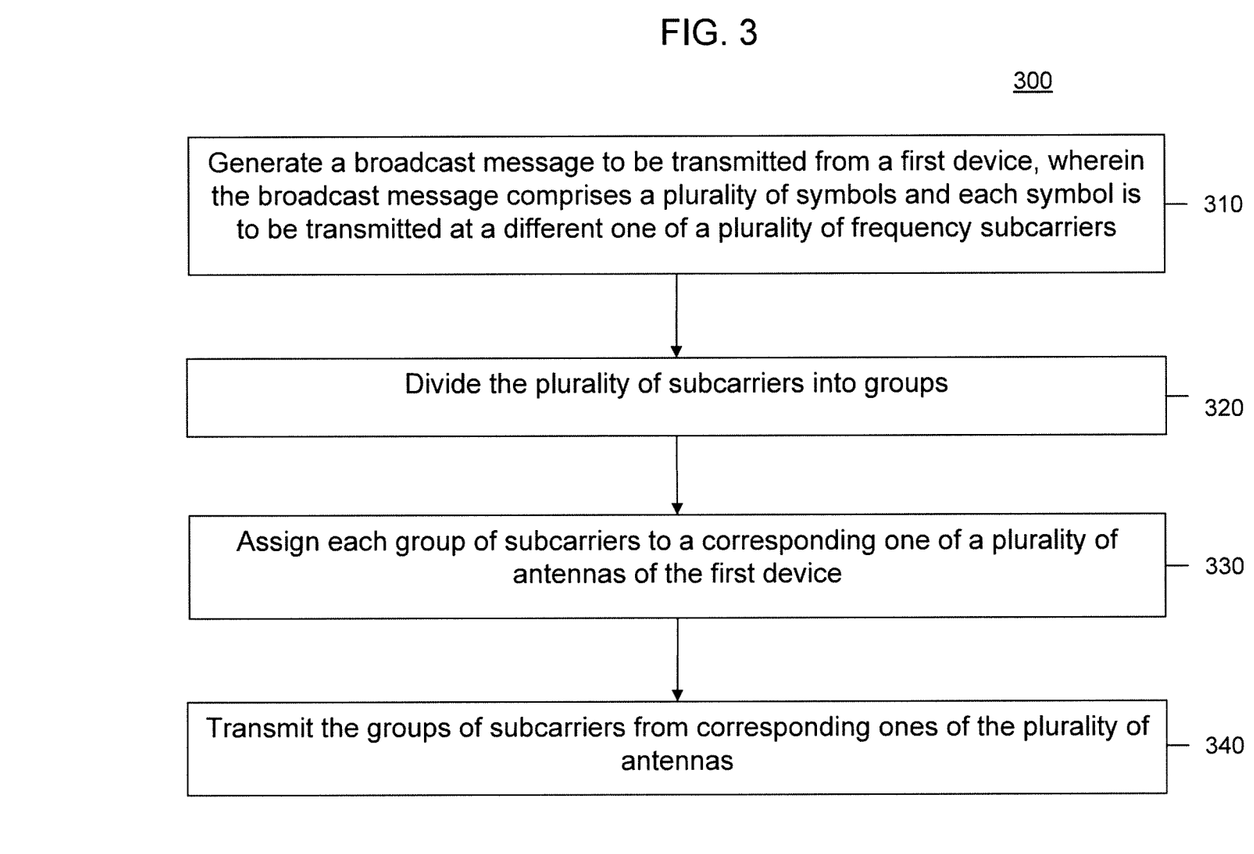
FIG. 3 is an example of a flow chart depicting the segmented transmission broadcast process.

Turning now to FIG. 3, the segmented transmission broadcast process 300 is now described. Briefly, the process 300 comprises generating a broadcast message comprising a plurality of symbols that are to be transmitted at different ones of a plurality of subcarriers. The plurality of subcarriers is divided into groups and each group is assigned to one of a plurality of antennas for transmission. The groups of subcarriers are transmitted by the corresponding antenna.

The process 300 is now described in more detail. At 310, a broadcast message to be transmitted from a first device is generated. The broadcast message may be intended for one or more MSs in a coverage area or for a particular MS whose location or spatial signature is not known. The broadcast message comprises a plurality of symbols and each symbol is to be transmitted at a different one of a plurality of frequency subcarriers. It should be understood that a symbol may be assigned to more than one subcarrier or that the plurality of symbols representing the broadcast message may assigned repeatedly to subsequent sets of subcarriers, i.e., a feature known as symbol repeating.

Next, at 320, the plurality of subcarriers is divided into groups. As an example, a WiMAX™ system operating in the 5 MHz partially used subchannel (PUSC) mode employs 512 subcarriers, of which, the middle 420 subcarriers are used to carry traffic. The 420 subcarriers are divided equally across multiple, e.g., eight, antennas into groups of subcarriers. For example, if there are eight antennas, then the 420 subcarriers are divided into eight groups of approximately 52 subcarriers. It is recognized by those skilled in the art that some of the subcarriers are dedicated as pilot subcarriers and do not carry data traffic. The subcarriers may be divided into contiguous groups (with respect to subcarrier frequency order) or non-contiguous groups.

At 330, each group of subcarriers is assigned to a corresponding one of a plurality of antennas. The groups of subcarriers may be assigned to geometrically adjacent or non-geometrically adjacent antennas. Examples of antenna assignments of groups of subcarriers are described in more detail in conjunction with FIGS. 4 and 5.

At 340, the groups of subcarriers are simultaneously transmitted from corresponding ones of the plurality of antennas, thus effecting the transmission of the broadcast message that comprises a plurality of symbols at corresponding ones of the plurality of subcarriers.

Figure 4:
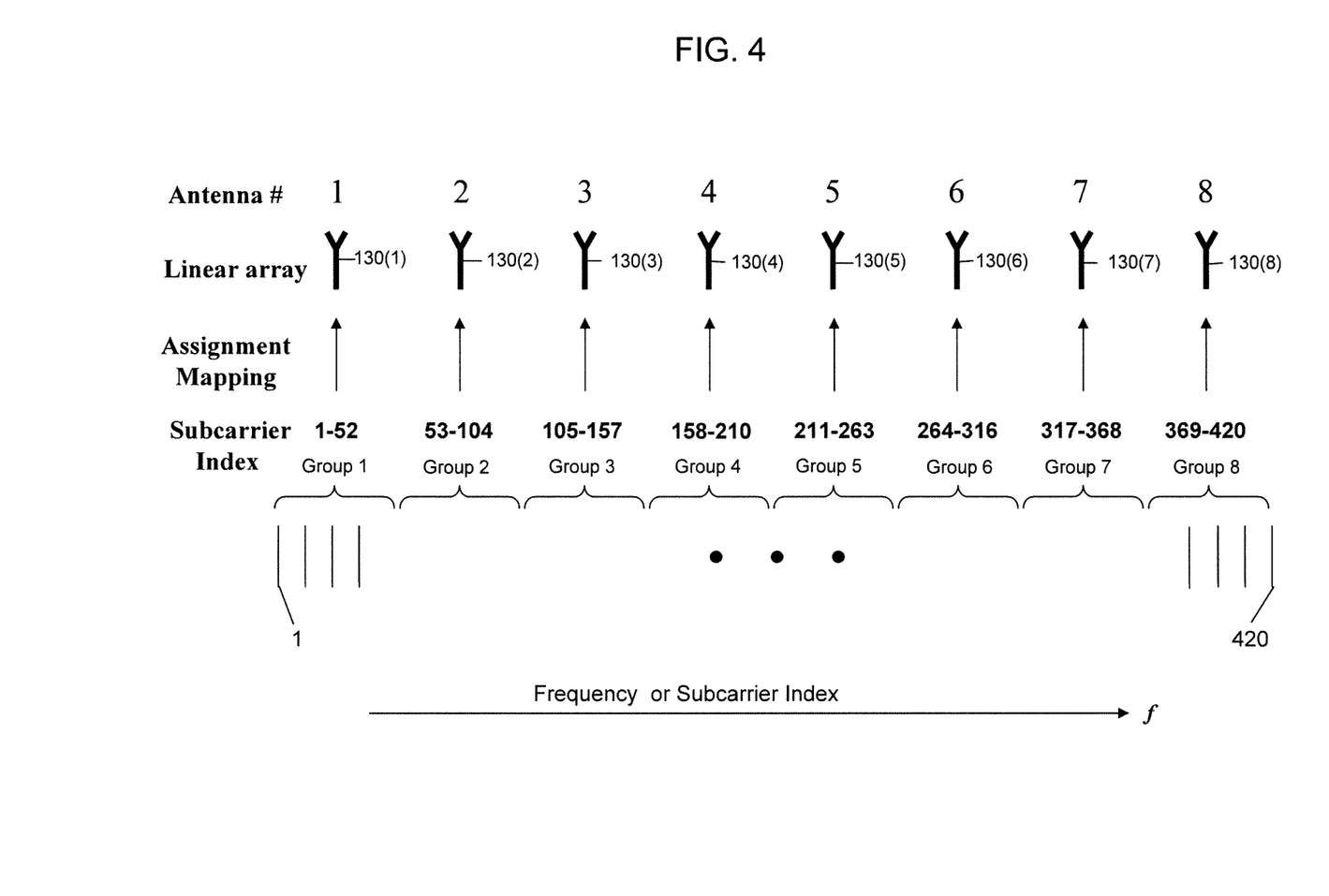
FIG. 4 is a diagram showing one example of assigning groups or segments of subcarriers of a broadcast message to corresponding antennas.

Referring now to FIG. 4, one example of grouping subcarriers and assigning groups to antennas in a linear antenna array is described. In this example, there are 420 subcarriers arranged in a contiguous order by frequency or subcarrier index. There are eight antennas (M=8) corresponding to antennas 130(1)-130(8). The 420 subcarriers are divided into eight groups of approximately 52 contiguous subcarriers such that Group 1 comprises subcarriers 1-52, Group 2 comprises subcarriers 53-104, Group 3 comprises subcarriers 105-157, and so on as shown in FIG. 4. Since "420" does not divide evenly by 8 some of the groups have more than 52 subcarriers. The eight groups of subcarriers are assigned to eight geometrically adjacent antennas, such that Group 1 comprising subcarriers 1-52 is assigned to antenna 1, Group 2 comprising subcarriers 53-104 is assigned to antenna 2, and so on as shown in FIG. 4, where antenna 1 is physically (geometrically) adjacent to antenna 2, antenna 2 is physically adjacent to antenna 3, and so on. Consequently, contiguous groups of subcarriers are assigned to geometrically adjacent antennas. Although the example in FIG. 4 depicts a linear antenna array, a uniform circular array or other physical antenna arrangement could be used.

Figure 5:
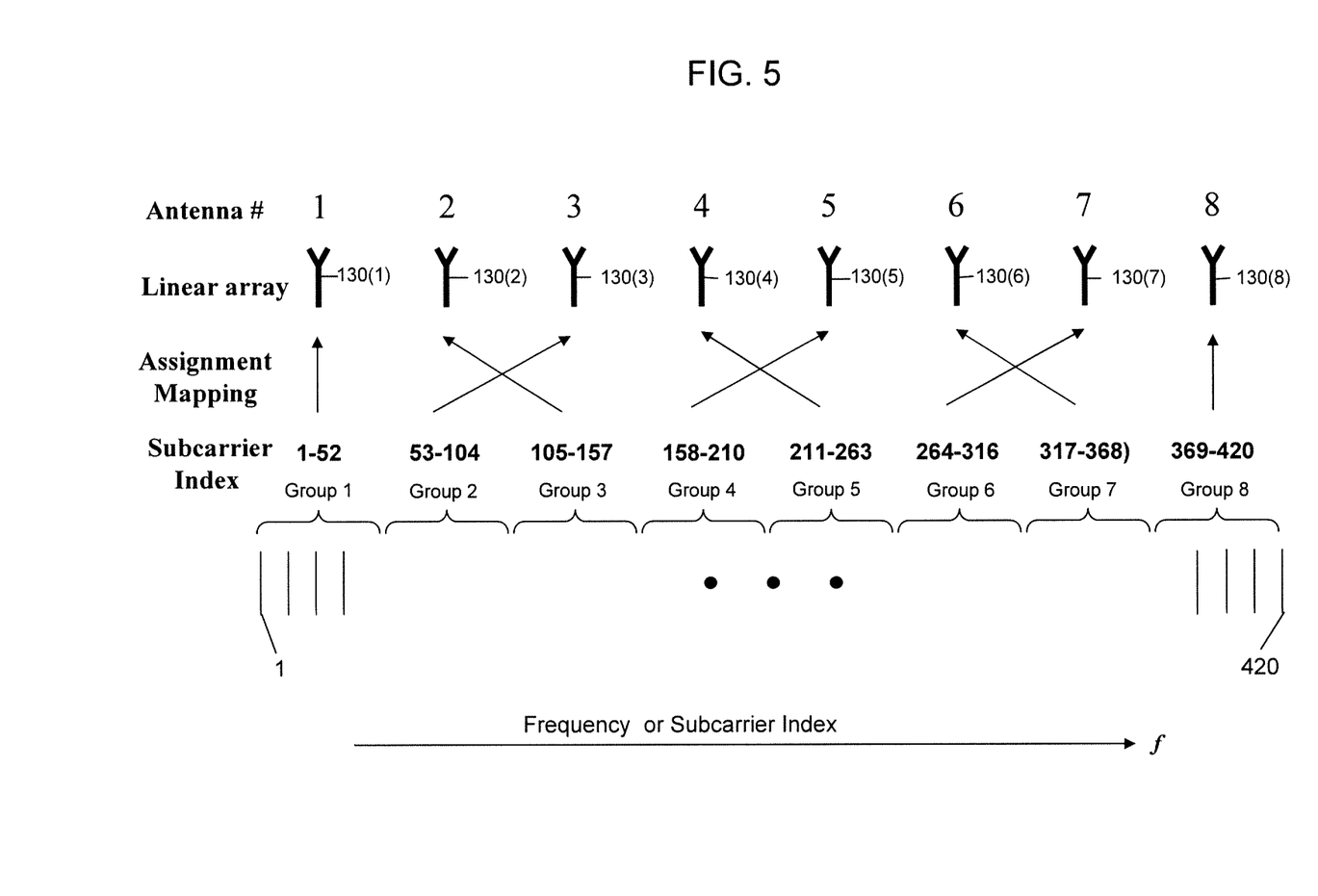
FIG. 5 is a diagram showing another example of assigning groups or segments of subcarriers of a broadcast message to corresponding antennas.

Turning to FIG. 5, another example of assigning groups of subcarriers to antennas is described. FIG. 5 shows the same linear antenna array configuration and subcarrier grouping as that shown in FIG. 4. In this example, contiguous groups of subcarriers are assigned to non-geometrically adjacent antennas. For example, the Group 2 of subcarriers 53-104 is assigned to antenna 3 and Group 3 of subcarriers 105-157 is assigned to antenna 2. Consequently, Group 1 of subcarriers 1-52 is assigned to antenna 1 but the contiguously adjacent group of subcarriers, Group 2, is not assigned to antenna 2 which is geometrically adjacent to antenna 1, but instead is assigned to antenna 3. Similar assignments of contiguous groups of subcarriers are made to adjacent antennas 4 and 5, and antennas 6 and 7, such that other contiguously adjacent groups of subcarriers are assigned to non-geometrically adjacent antennas.

Figure 6:
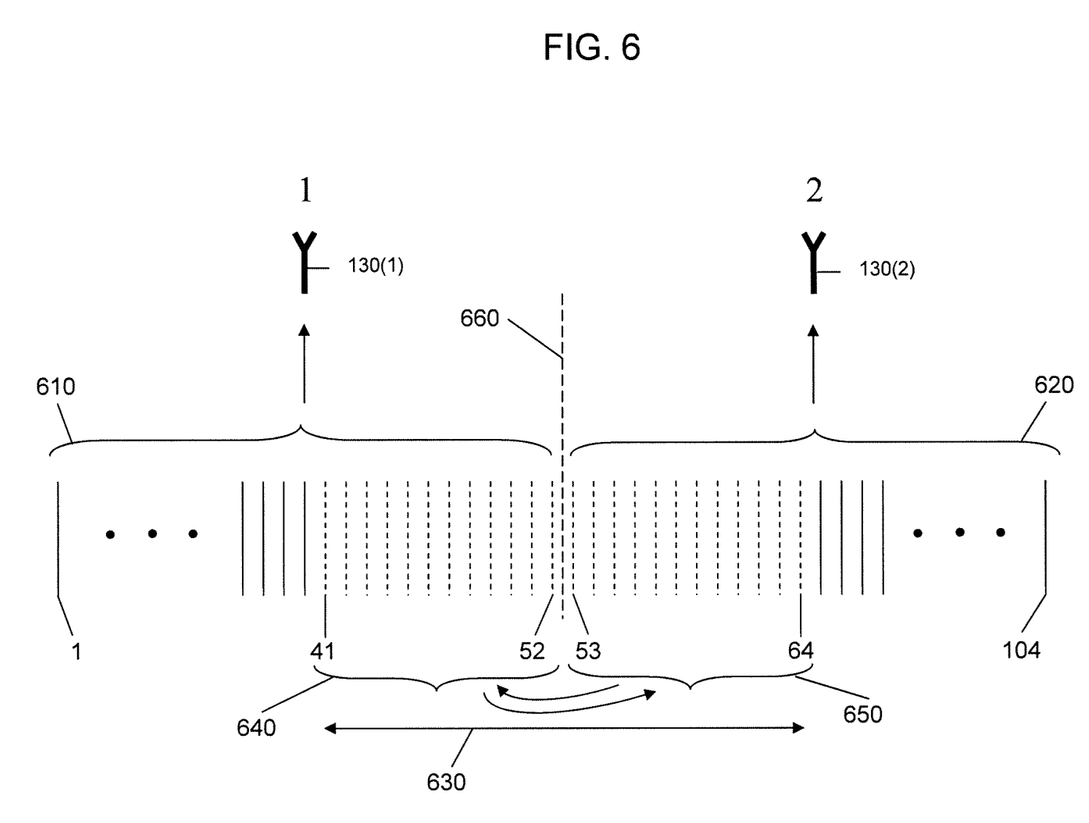
FIG. 6 is a diagram showing a technique for weighting and assigning subcarriers of two segments at a transition region between the two adjacent groups of subcarriers.

Referring now to FIG. 6, an enlarged view of the subcarrier assignments for two adjacent groups of subcarriers to antennas 1 and 2 is shown. More specifically, FIG. 6 illustrates a technique to weight subcarriers that are within a transition region between the two adjacent groups to smooth any channel discontinuities between groups of subcarriers. For example, Group 610 comprising subcarriers 1-52 is assigned to antenna 1 and group 620 comprising subcarriers 53-104 is shown assigned to antenna 2. There is a transition region 630 between the two contiguous groups 610 and 620. In this example, the transition region 630 comprises subcarriers 41-64, but the transition region may comprise as few as a one or two subcarriers. Subcarriers 41-52 in the transition region 630 form a first subset 640 of subcarriers in group 610 that, by virtue of being part of group 610, are assigned to antenna 1, and subcarriers 53-104 form a second subset 650 of subcarriers in group 620 that, by virtue of being part of group 620, are assigned to antenna 2. The transition region 630 spans across a boundary 660 between the contiguous subcarrier groups 610 and 620.

The two subsets 640 and 650 of subcarriers are also each assigned to and transmitted from the geometrically adjacent antenna. Specifically, the subcarriers in the first subset 640 are also assigned to and transmitted from antenna 2 and the subcarriers of the second subset 650 are also assigned to and transmitted from antenna 1. Thus, in this example subcarriers 1-64 are assigned to antenna 1 and subcarriers 41-104 are assigned to antenna 2. The example depicted uses 24 subcarriers for the transition region 630. In other examples, the transition region 630 may comprise an even number of subcarriers (e.g., 16, 12, 8, 6), or alternatively, an odd number of subcarriers. The number of subcarriers selected for each subset need not be symmetric with respect to the boundary 660. Moreover, a similar transition region is created for other contiguous groups of subcarriers.

In one example, a smoothing function is applied to weight the respective magnitudes of the symbols at the subcarriers in the transition region 630 in order to smooth any discontinuities that may occur at a boundary between two groups of subcarriers. An example of a smoothing function is described with reference to FIGS. 7 and 8 following the example shown in FIG. 6.

Figure 7:
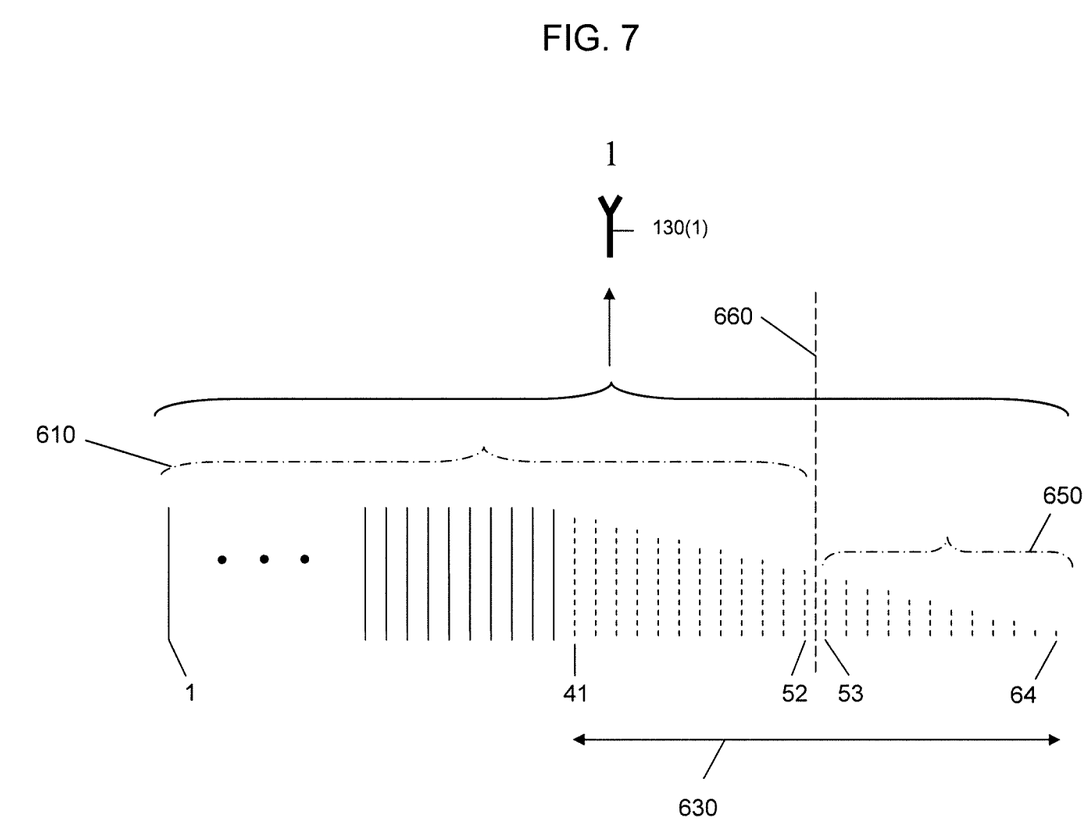
FIGS. 7 and 8 are diagrams illustrating details associated with the technique for weighting and assigning subcarriers at the transition region of two adjacent groups of subcarriers.

Reference is now made to FIG. 7. FIG. 7 shows that subcarriers 41-64 of the transition region 630 are weighted by a linear ramp smoothing function that decreases the magnitude of the subcarriers in the transition region 630 from subcarrier 41 to and through the boundary 660 to subcarrier 64, where the subcarriers 41-64 weighted in this matter are transmitted via antenna 1. Although a linear ramp function with constant slope is shown in FIG. 7, other functions with a varied slope or non-linear functions may also be employed. For example, a step function may be employed. Thus, FIG. 7 shows that subcarriers 53-64 (subset 650) that are assigned to and transmitted from antenna 2 are also assigned to and transmitted from antenna 1, but with a decreasing weight as the subcarrier index moves away from the boundary 660. Furthermore, subcarriers 41-52 that are assigned to antenna 1 as part of the group 610 are weighted with a decreasing weight from a nominal weight at subcarrier 40 as the subcarrier index approaches the boundary 660.

Figure 8:
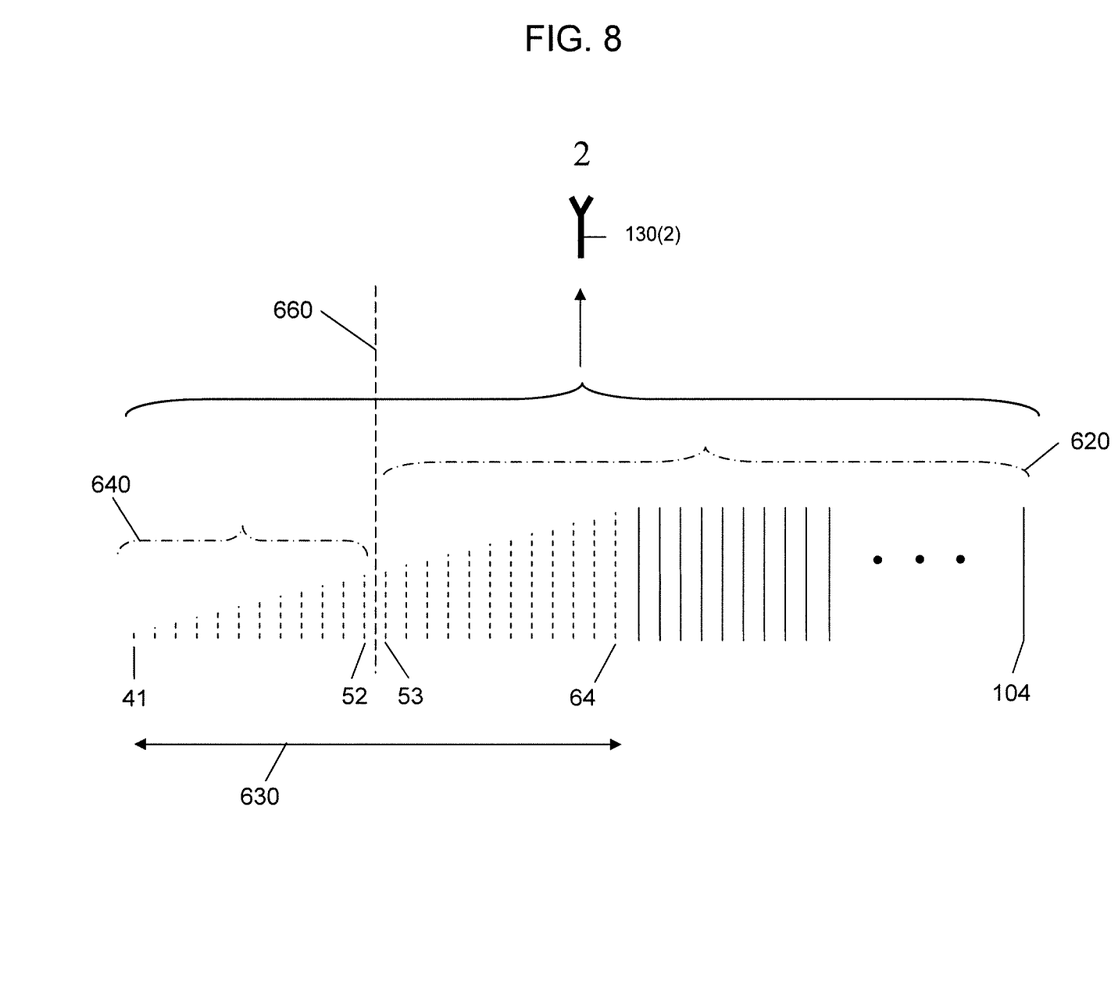

FIG. 8 depicts a subcarrier weighting arrangement similar to that shown in FIG. 7, but with respect to subcarriers assigned to antenna 2. Subcarriers 41-64 of the transition region 630 are weighted by a linear ramp smoothing function that increases the magnitude of the subcarriers in the transition region from subcarrier 41 to and through the boundary 660 to subcarrier 64 shown assigned to antenna 2, where the subcarriers 41-64 weighted in this manner are transmitted via antenna 2. FIG. 8 shows that subcarriers 41-52 (subset 640) that are assigned to and transmitted from antenna 1 are also assigned to and transmitted from antenna 2, but with an increasing weight as the subcarrier index moves towards the boundary. Subcarriers 53-64 that are assigned to antenna 2 as part of group 620 are weighted with an increasing weight as the subcarrier index moves away from the boundary 660 until a nominal weight is reached at subcarrier 64. As in FIG. 7, other types of smoothing functions (non-linear, etc.) may be employed for the weighting shown in FIG. 8.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
generating a broadcast message to be transmitted from a first device, wherein the broadcast message comprises a plurality of symbols and each symbol is to be transmitted at a different one of a plurality of frequency subcarriers;
dividing the plurality of subcarriers into groups;
assigning each group of subcarriers to a corresponding one of a plurality of antennas of the first device; and
transmitting the groups of subcarriers from corresponding ones of the plurality of antennas.

2. The method of claim 1, wherein dividing comprises dividing the plurality of subcarriers into groups of contiguous subcarriers.

3. The method of claim 2, wherein assigning comprises assigning each group of subcarriers to a corresponding one of the plurality of antennas such that adjacent groups are assigned to geometrically adjacent ones of the plurality of antennas.

4. The method of claim 2, wherein assigning comprises assigning each group of subcarriers to a corresponding one of the plurality of antennas such that adjacent groups are assigned to non-geometrically adjacent ones of the plurality of antennas.

5. The method of claim 1, further comprising allocating first and second subsets of subcarriers of respective adjacent first and second groups at a boundary there between, and weighting the subcarriers in the first and second subsets so as to smooth any discontinuities that may occur at the boundary between the first and second groups.

6. The method of claim 5, wherein assigning comprises further assigning the subcarriers in the first subset to the antenna associated with the second group, and further assigning the subcarriers in the second subset to the antenna associated with the first group.

7. The method of claim 6, wherein weighting comprises weighting the subcarriers in the first and second subsets that are assigned to the antenna associated with the first group with a weighting function that decreases with subcarrier frequency.

8. The method of claim 6, wherein weighting comprises weighting the subcarriers in the first and second subsets that are assigned to the antenna associated with the second group with a weighting function that increases with subcarrier frequency.

9. An apparatus comprising:
a plurality of antennas;
a transmitter configured to transmit a broadcast message via respective ones of the plurality of antennas, wherein the broadcast message comprises a plurality of symbols and each symbol is to be transmitted at a different one of a plurality of frequency subcarriers;
a controller coupled to the transmitter and configured to:
divide the plurality of subcarriers into groups; and
assign each of the individual groups of subcarriers to a corresponding one of the plurality antennas for transmission.

10. The apparatus of claim 9, wherein the controller is configured to divide the plurality of subcarriers into groups of contiguous subcarriers.

11. The apparatus of claim 10, wherein the controller is configured to assign each group of subcarriers to a corresponding one of the plurality antennas such that adjacent groups are assigned to geometrically adjacent ones of the plurality of antennas.

12. The apparatus of claim 10, wherein the controller is configured to assign each group of subcarriers to a corresponding one of the plurality antennas such that adjacent groups are assigned to non-geometrically adjacent ones of the plurality of antennas.

13. The apparatus of claim 9, wherein the controller is further configured to allocate first and second subsets of subcarriers of respective adjacent first and second groups at a boundary there between, and to weight the subcarriers in the first and second subsets so as to smooth any discontinuities that may occur at the boundary between the first and second groups.

14. The apparatus of claim 13, wherein the controller is configured to further assign the subcarriers in the first subset to the antenna associated with the second group, and to further assign the subcarriers in the second subset to the antenna associated with the first group.

15. The apparatus of claim 14, wherein the controller is configured to weight the subcarriers in the first and second subsets that are assigned to the antenna associated with the first group by a weighting function that decreases with subcarrier frequency, and to weight the subcarriers in the first and second subsets that are assigned to the antenna associated with the second group by a weighting function that increases with subcarrier frequency.

16. Logic encoded in one or more non-transitory tangible media for execution and when executed operable to:
generate a broadcast message to be transmitted from a first device, wherein the broadcast message comprises a plurality of symbols and each symbol is to be transmitted at a different one of a plurality of frequency subcarriers;
divide the plurality of subcarriers into groups; and
assign each group of subcarriers to a corresponding one of a plurality of antennas of the first device such that the groups of subcarriers are transmitted from corresponding ones of the plurality of antennas.

17. The logic of claim 16, wherein the logic that divides comprises logic that divides the plurality of subcarriers into groups of contiguous subcarriers.

18. The logic of claim 17, wherein the logic that assigns comprises logic that assigns each group of subcarriers to a corresponding one of the plurality of antennas such that adjacent groups are assigned to geometrically adjacent ones of the plurality of antennas.

19. The logic of claim 17, wherein the logic that assigns comprises logic that assigns each group of subcarriers to a corresponding one of the plurality of antennas such that adjacent groups are assigned to non-geometrically adjacent ones of the plurality of antennas.

20. The logic of claim 16, further comprising logic to allocate first and second subsets of subcarriers of respective adjacent first and second groups at a boundary there between, and to weight the subcarriers in the first and second subsets so as to smooth any discontinuities that may occur at the boundary between the first and second groups.

21. The logic of claim 20, wherein the logic that assigns further comprises logic to assign the subcarriers in the first subset to the antenna associated with the second group, and to further assign the subcarriers in the second subset to the antenna associated with the first group.

22. The logic of claim 21, wherein the logic that weights comprises logic to weight the subcarriers in the first and second subsets that are assigned to the antenna associated with the first group by a weighting function that decreases with subcarrier frequency, and to weight the subcarriers in the first and second subsets that are assigned to the antenna associated with the second group by a weighting function that increases with subcarrier frequency.

23. The method of claim 1, further comprising allocating first and second subsets of subcarriers of respective adjacent first and second groups at a boundary there between, wherein assigning comprises further assigning the subcarriers in the first subset to the antenna associated with the second group, and further assigning the subcarriers in the second subset to the antenna associated with the first group.

24. The method of claim 1, wherein each group of subcarriers is transmitted via a spatially separate radio frequency beam having a radiation pattern of the corresponding one of the antennas with no beamforming applied to the groups of subcarriers.

25. The method of claim 1, wherein the method includes symbol repeating in which symbols of the broadcast message are assigned to more than one subcarrier or more than one group of subcarriers.

26. The apparatus of claim 9, wherein the controller is further configured to allocate first and second subsets of subcarriers of respective adjacent first and second groups at a boundary there between, wherein the controller is configured to further assign the subcarriers in the first subset to the antenna associated with the second group, and to further assign the subcarriers in the second subset to the antenna associated with the first group.

27. The logic of claim 16, further comprising logic to allocate first and second subsets of subcarriers of respective adjacent first and second groups at a boundary there between, wherein the logic that assigns further comprises logic to assign the subcarriers in the first subset to the antenna associated with the second group, and to further assign the subcarriers in the second subset to the antenna associated with the first group.

28. The method of claim 1, wherein the number of groups of subcarriers is equal to the number of antennas.

29. The apparatus of claim 9, wherein the transmitter is configured to transmit each group of subcarriers via a spatially separate radio frequency beam having a radiation pattern of the corresponding one of the antennas with no beamforming applied to the groups of subcarriers.

30. The apparatus of claim 9, wherein the number of groups of subcarriers is equal to the number of antennas.

31. The logic of claim 16, wherein the number of groups of subcarriers is equal to the number of antennas.

32. The logic of claim 16, wherein the logic that assigns comprises logic that assigns such that each group of subcarriers is transmitted via a spatially separate radio frequency beam having a radiation pattern of the corresponding one of the antennas with no beamforming applied to the groups of subcarriers.

* * * * *